(12) United States Patent
Wilhelm

(10) Patent No.: US 6,931,005 B1
(45) Date of Patent: Aug. 16, 2005

(54) IP MULTICAST SERVICES OVER ATM MULTICAST

(75) Inventor: Diana Joan Wilhelm, Woodlawn (CA)

(73) Assignee: Nortel Networks Limited, St. Laurent (*) Notice: Subject to any disclaimer, the term of this patent is extended or adjusted under 35 U.S.C. 154(b) by 786 days.

(21) Appl. No.: 09/648,610

(22) Filed: Aug. 28, 2000

Related U.S. Application Data

(60) Provisional application No. 60/188,459, filed on Mar. 10, 2000.

(51) Int. Cl.[7] .............................................. H04L 12/56
(52) U.S. Cl. ...................... 370/390; 370/395.1; 370/408
(58) Field of Search ................................ 370/255, 256, 370/390, 395.1, 408

(56) References Cited

U.S. PATENT DOCUMENTS

| | | | | |
|---|---|---|---|---|
| 5,331,637 | A | * 7/1994 | Francis et al. | 370/408 |
| 5,825,772 | A | 10/1998 | Dobbins et al. | 370/396 |
| 5,831,975 | A | 11/1998 | Chen et al. | 370/256 |
| 5,835,723 | A | 11/1998 | Andrews et al. | 395/200.56 |
| 5,946,316 | A | * 8/1999 | Chen et al. | 370/408 |
| 6,088,333 | A | * 7/2000 | Yang et al. | 370/238 |
| 6,097,720 | A | * 8/2000 | Araujo et al. | 370/355 |
| 6,556,544 | B1 | * 4/2003 | Lee | 370/256 |
| 6,611,528 | B1 | * 8/2003 | Farinacci et al. | 370/432 |
| 6,611,872 | B1 | * 8/2003 | McCanne | 709/238 |

FOREIGN PATENT DOCUMENTS

| | | | |
|---|---|---|---|
| EP | 0 818 903 | 1/1998 | ........... H04L/12/18 |
| EP | 0 854 618 | 7/1998 | ........... H04L/12/56 |

OTHER PUBLICATIONS

G.J. Armitage, "Multicast and Multiprotocol Support for ATM Based Internets" vol. 25, No. 2, Apr. 1, 1995, pp. 34–46, XP000670497.

* cited by examiner

*Primary Examiner*—Min Jung
(74) *Attorney, Agent, or Firm*—Max R. Wood; Ogilvy Renault, LLP

(57) ABSTRACT

A method and apparatus for reducing bandwidth usage in an ATM switching network by controlling bandwidth used for IP multicasting through the switching network. Bandwidth usage is controlled by modifying ingress and access modules, such as IP service gateways and access modules that terminate branches of a multicast tree. If a join request is received at an IP service gateway from a sink node served by an access module, the IP service gateway instructs the access module to graft a leaf to the branch to join the sink node to the tree and to merge the multicast packets with other IP packets for the sink node. Consequently, only one connection carrying the multicast traffic is required between the IP service gateway and the access module. Bandwidth usage in the ATM switching network is thereby controlled, and bandwidth usage in service access trunks connecting the access modules to the ATM switching network is reduced.

50 Claims, 4 Drawing Sheets

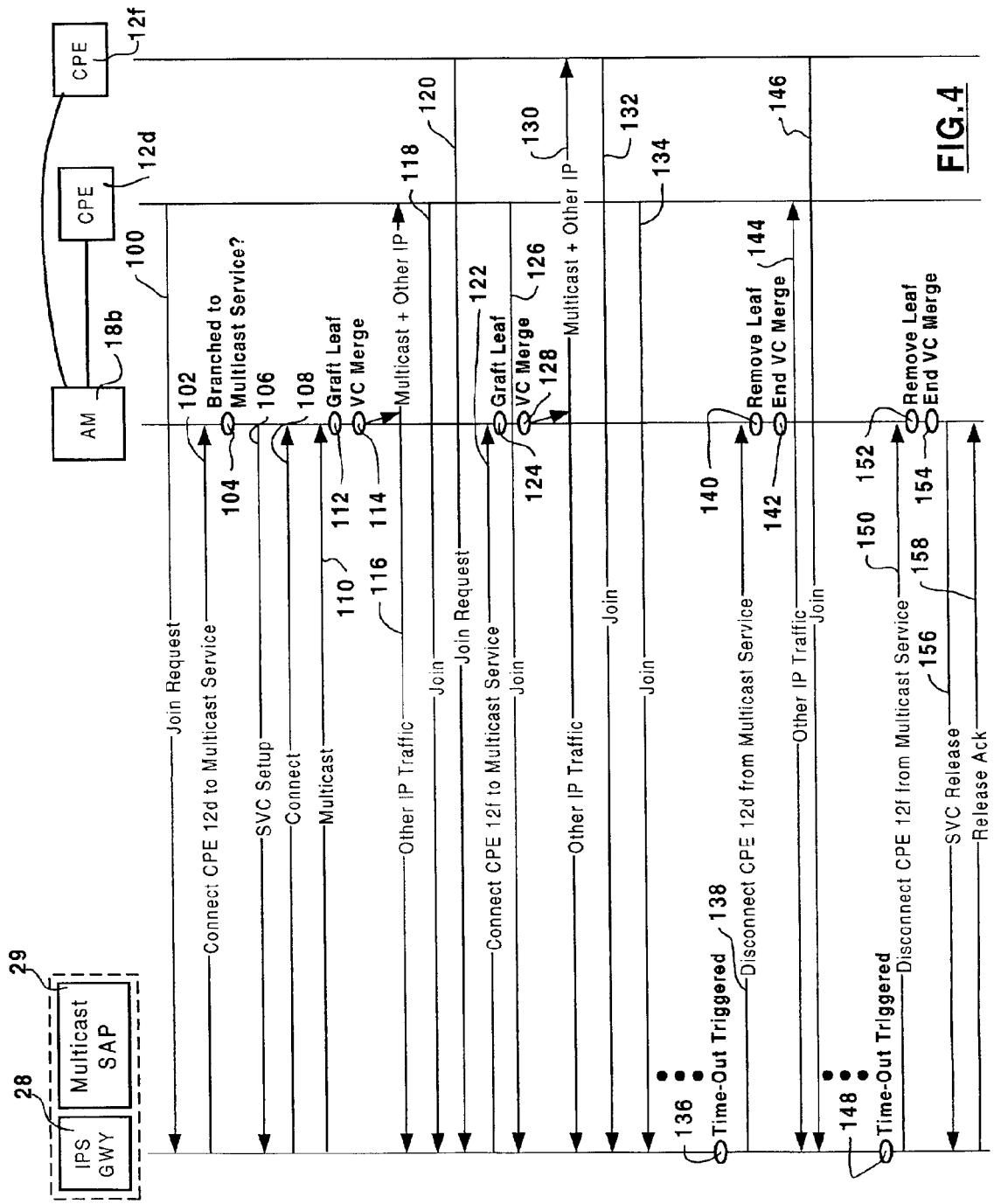

IP MULTICAST SERVICES OVER ATM MULTICAST

CROSS-REFERENCE TO RELATED APPLICATIONS

This application claims the benefit of U.S. Provisional Application No. 60/188,459, filed Mar. 10, 2000.

MICROFICHE APPENDIX

Not applicable.

TECHNICAL FIELD

The present invention relates to Internet Protocol (IP) multicast services, and in particular to a method and system for grafting connections to an IP multicast tree set up through an Asynchronous Transfer Mode (ATM) switching network.

BACKGROUND OF THE INVENTION

The evolution of communications networks (e.g. the Internet) has been accompanied by increasing demand by users for delivery of multicast services over such networks. Multicast services distribute, for example, news, entertainment or educational content, which is transported over the network from a single source node to a plurality of sink nodes. The source node is typically a multicast server, such as an Internet Protocol (IP) server connected to an IP data network that outputs the multicast content. The sink node is typically an end-user's communication device such as a personal computer (PC) connected to the network via a modem.

For high bandwidth applications, the use of Digital Subscriber Loop (DSL) technology, cable modems, satellite systems, and the like, are becoming increasingly popular as a means of coupling customer-premise equipment (CPE), such as personal computers (PCs) or Local Area Network (LAN) servers to the communications network. Many of these access technologies are based primarily on the use of an ATM switching network for data transport, which facilitates high bandwidth data transfer, while simplifying network provisioning and management. Multicast data from the source node is typically routed to the ATM switching network through an Internet Protocol (IP) service gateway (IPS GWY)). Each sink node (i.e. CPE) is normally connected to the ATM switching network via an access module (e.g. a Digital Subscriber Line Access Multiplexer (DSLAM); a cable headend; a wireless headend; a satellite base station; an optical line termination; or customer premise equipment).

When an end-user wishes to join a multicast session, a join request message originating at the end-user's CPE is forwarded to the IPS GWY. Upon receipt of the join request message, the IPS GWY joins the sink node directly to the multicast tree if the IPS GWY is already grafted to the multicast tree. If not, the IPS GWY establishes a connection with the multicast source node to establish a branch on the multicast tree. The IPS GWY joins the sink node to the multicast tree by performing standard IP routing to route the multicast traffic into a virtual channel used to provide DSL service to the end-user's CPE. Once the multicast source has been joined, high bandwidth multicast content originating at the source node is routed through the access module to the end-user's CPE over the end-user's channel, a switched virtual circuit (SVC) or a permanent virtual circuit (PVC), for example. This approach avoids supporting any IP protocols in nodes in the ATM switching network. However, a limitation of this approach is that it results in redundant duplication of multicast traffic within the ATM switching network.

In particular, two or more participating CPEs served by the same access module results in multiple copies of the multicast traffic being routed through the ATM switching network between the IPS GWY and the access module. This can degrade performance on access feeder trunks between the access module and the ATM switching network, due to bandwidth exhaustion. Furthermore, since the multicast packets traverse the ATM switching network via virtual channels (VCs) serving the respective CPEs, the quality of service (QoS) associated with the respective VCs is transferred to the multicast packets. This may affect the rate of transfer of the multicast packets across the ATM switching network and degrade multicast performance.

Accordingly, a way of grafting end-users to a multicast tree that minimizes duplication of traffic within the ATM switching network while preserving associated QoS is highly desirable.

SUMMARY OF THE INVENTION

An object of the present invention is to provide a method and apparatus for grafting end-users to a multicast tree in which duplication of multicast traffic within the ATM switching network is reduced.

It is another object of the invention to provide a method of providing multicast service to DSL subscribers that reduces congestion on an access feeder trunk between a access module and an ATM transport network.

The invention therefore provides a method of setting up a connection through an Asynchronous Transfer Mode (ATM) switching network between a sink node, such as customer premise equipment (CPE), and a multicast tree, the multicast tree being coupled to the ATM switching network via an ingress node, such as an Internet Protocol Service Gateway (IPS GWY) when the sink node is coupled to the ATM switching network via an access module, such as a Digital Subscriber Link Access Module (DSLAM). In accordance with the method, the access module through which the sink node is coupled to the ATM switching network is identified. A message is then sent to the access module requesting that the sink node be connected to the multicast tree. On receipt of the message, the access module grafts a leaf to the multicast tree to connect the sink node to the multicast tree, and merges multicast packets into an existing service connection for the sink node.

The access module and the sink node are identified by the ingress node which examines a virtual channel (VC) on which a join request message was received from the sink node to identify the access module and the sink node. The leaf to the multicast tree at the access module is grafted to the multicast tree by performing a virtual channel (VC) merge, to merge the multicast packets with other IP packet traffic for the sink node. The VC merge is performed by the access module. If the access module is not branched to the multicast tree, the access module sends a signaling message to the ingress node requesting a connection with the ingress node in order to receive copies of the multicast packets.

The invention therefore provides a method of transferring multicast packets to an end user through an ATM switching network between a sink node and a multicast tree, the sink node being coupled to the ATM switching network via a respective one of a plurality of access modules, for example DSLAMs. The system comprises means at the ingress node for identifying an access module through which the sink node is coupled to the ATM switching network. The system further comprises means at the access module for determining whether the access module is already part of the multicast tree. The system also includes means at the access module for grafting a leaf to the multicast tree when the identified access module is connected to the multicast tree. The ingress node is, for example, an Internet Protocol Service Gateway (IPS GWY), and the access module is, for example, a Digital Subscriber Line Access Multiplexer (DSLAM); a cable headend; a wireless headend; a satellite base station; and optical line termination; or, an ATM side of a customer premise equipment. The means for identifying the access module comprises a table for relating a virtual channel on which the join request was received from the sink node with an address of an access module that supports the virtual channel. The access module receives a connection instruction from the ingress node requesting connection of the sink node to the multicast tree. The connection request message includes a multicast session identifier uniquely identifying the multicast session. The multicast session identifier is used at the access module to determine whether multicast traffic associated with the multicast session identifier is being received at the access module. The sink node is grafted to the multicast tree at the access module by performing a VC merge at the access module. Consequently, only one copy of the multicast traffic traverses the ATM switching network between the ingress node and the access module while a plurality of sink nodes may be joined to the multicast tree at the access module.

The invention further provides an IPS GWY that is adapted to reduced the duplication of multicast traffic through the ATM switching network. The IPS GWY is adapted to identify an access module through which the sink node that requested a join to the multicast tree is coupled to the ATM switching network. The IPS GWY is further adapted to request the access module to join the sink node to the multicast tree, and to set up a virtual connection with the access module to connect the access module to the multicast tree, if required. The IPS GWY identifies the access module using a table that relates a virtual channel (VC) on which a join request was received from the sink node with a network address of the access module.

The invention also provides an access module for an ATM switching network adapted to enable the grafting of a connection between a sink node and a multicast tree. The access module is coupled to the ATM switching network and the sink node. The access module comprises means for grafting a leaf to the multicast tree to connect the sink node to the multicast tree and means for performing a VC merge to merge multicast packets with other IP traffic being sent to and from the sink node. The access module only grafts a leaf to the multicast tree and performs a VC merge on receipt of a request message from a gateway node through which the multicast tree enters the ATM switching network. The signaling message requests that the access module connect the sink node to the multicast tree. On receipt of the request, the access module performs a VC merge to merge the multicast packets with other IP traffic for the sink node.

The invention therefore significantly reduces congestion in an ATM switching network that provides multicast services without impacting existing Internet protocol standards. The invention also supports the ability to combine multiple connections together, each of the connections having a different quality of services, into a single ATM connection as a service for the end-user without the end-user being aware of the quality of service considerations at work in the network. Therefore, a single copy of an IP multicast service is shared among users. The access module, however, requires no knowledge of the IP protocol used for delivering the multicast traffic to the end-users. Thus, the methods and apparatus in accordance with the invention significantly reduce duplication of traffic through the ATM network while ensuring high quality service without changing customer premises equipment.

BRIEF DESCRIPTION OF THE DRAWINGS

Further features and advantages of the present invention will become apparent from the following detailed description, taken in combination with the appended drawings, in which:

FIG. 4 is a message flow diagram schematically illustrating the principal messages exchanged between the IPS GWY and two CPEs shown in FIG. 3, to join the CPEs to a multicast tree in accordance with the present invention.

It will be noted that throughout the appended drawings, like features are identified by like reference numerals.

DETAILED DESCRIPTION OF THE PREFERRED EMBODIMENT

Figure 1:
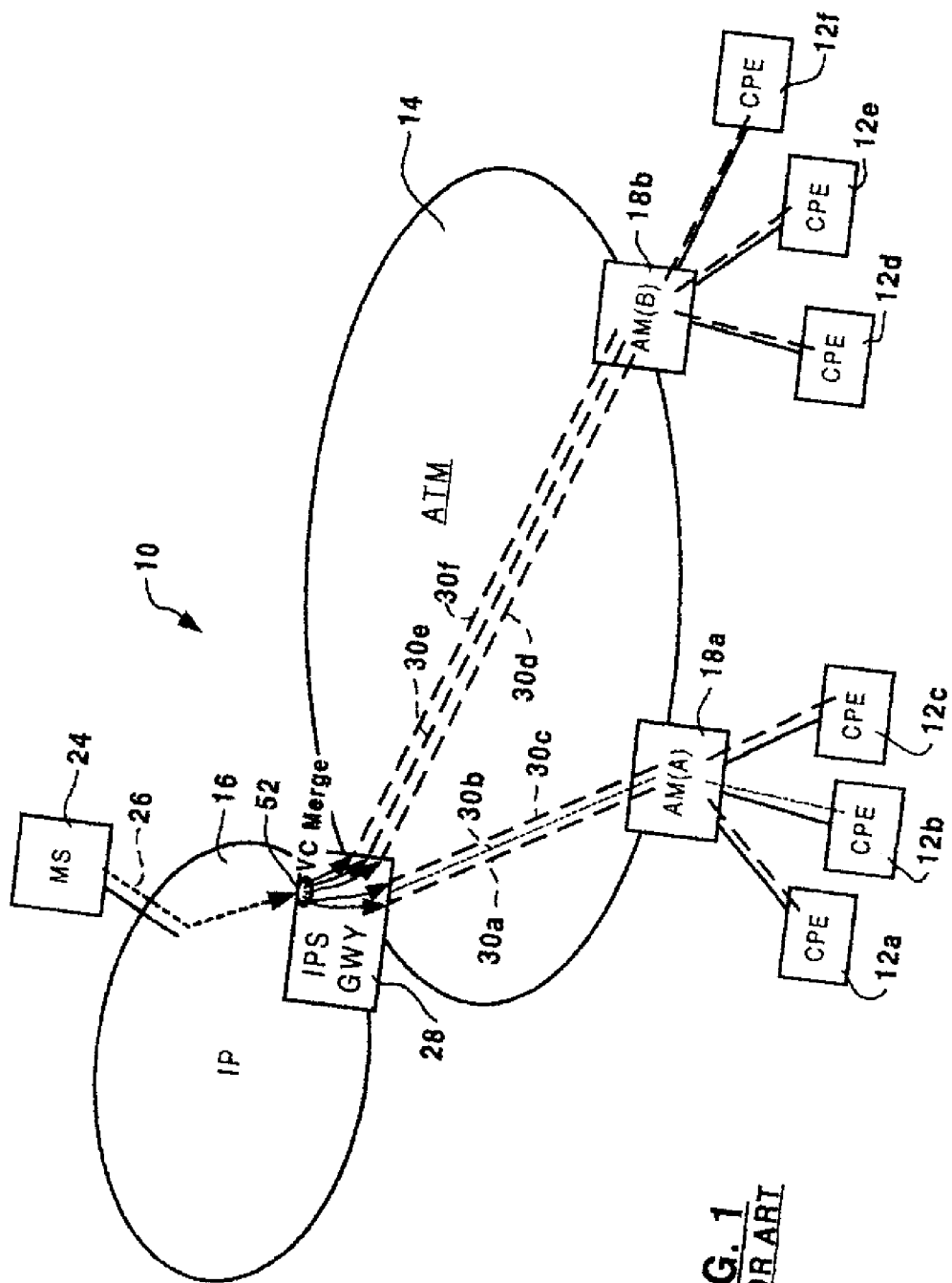
FIG. 1. is a block diagram schematically illustrating respective multicast trees mapped through an ATM network in accordance with the prior art.

The present invention provides a method and apparatus for grafting connections to a multicast tree through an ATM switching network. FIG. 1 is a block diagram schematically illustrating a communications network 10 in which the present invention may be deployed. The communications network 10 generally comprises an asynchronous transfer mode (ATM) switching network 14 coupled to an Internet Protocol (IP) network 16 via one or more IP service gateways 28 (IPS GWY). The ATM switching network 14 includes a plurality of access modules (AM) 18a and 18b (two are shown in FIG. 1), each of which serves to couple a respective plurality of end-user customer premise equipment (CPE) 12 (each of which may, for example, be a DSL modem connected to a PC). As is known in the art, this arrangement permits each CPE 12a–f to obtain high bandwidth access to the IP network 16 using conventional virtual channel (VC) connections 30a–30f mapped through the ATM switching network 14 between one of the access modules 18a,b and the IPS GWY 28.

As shown in FIG. 1, a multicast server 24 can be coupled to the IP network 16 in a conventional manner. A CPE 12 is thereby enabled to access the multicast server 24 and send a join message via the IPS GWY 28 to the multicast server 24 to receive multicast content sourced from the multicast server 24. In response to the join message, multicast packets will be routed to the end-user's CPE 12 via the IPS GWY 28 to a multicast tree 26 originating at the multicast server 24, so that the end-user's CPE 12 will be enabled to receive the multicast traffic using IP routing functions. As illustrated in FIG. 1, the IPS GWY 28 is commonly used as a gateway for the multicast server 24 to route multicast traffic into the ATM switching network 14. Thus multicast traffic sourced from the multicast server 24 (the root of the multicast tree) is conveyed to the IPS GWY 28 in a conventional manner, and then conveyed to each recipient of the multicast traffic using virtual channel connections 30a–f mapped through the ax ATM switching network 14 between the IPS GWY 28 and the respective access modules 18. As is well understood by those skilled in the art, the CPEs 12a–f are connected to the IPS GWY 28 by a plurality of respective VCs 30a–f. The VCs 30a–f may be switched virtual circuits (SVCs), or permanent virtual circuits (PVCs), as set up by a service provider. Each VC connects an ATM side of the CPE with the IPS GWY 28. When an end user of a CPE 12a–f sends a join message to join a multicast tree, the join message traverses the corresponding VC 30a–f to the IPS GWY, which performs an IP routing function to merge the multicast content, received from MS 24 through multicast tree 26, into a respective VC 30a–f of the end user. As shown in FIG. 1, end-users at CPEs 12a,c–f are grafted to the multicast tree 26. Subsequently, service access trunks (not shown) connecting the respective AMs 18a,b to the ATM switching network 14 are congested by the heavy traffic induced by multiple copies of the bandwidth-intensive multicast content transferred simultaneously over a plurality of VCs supported by the service access links 30a–f.

Figure 2:
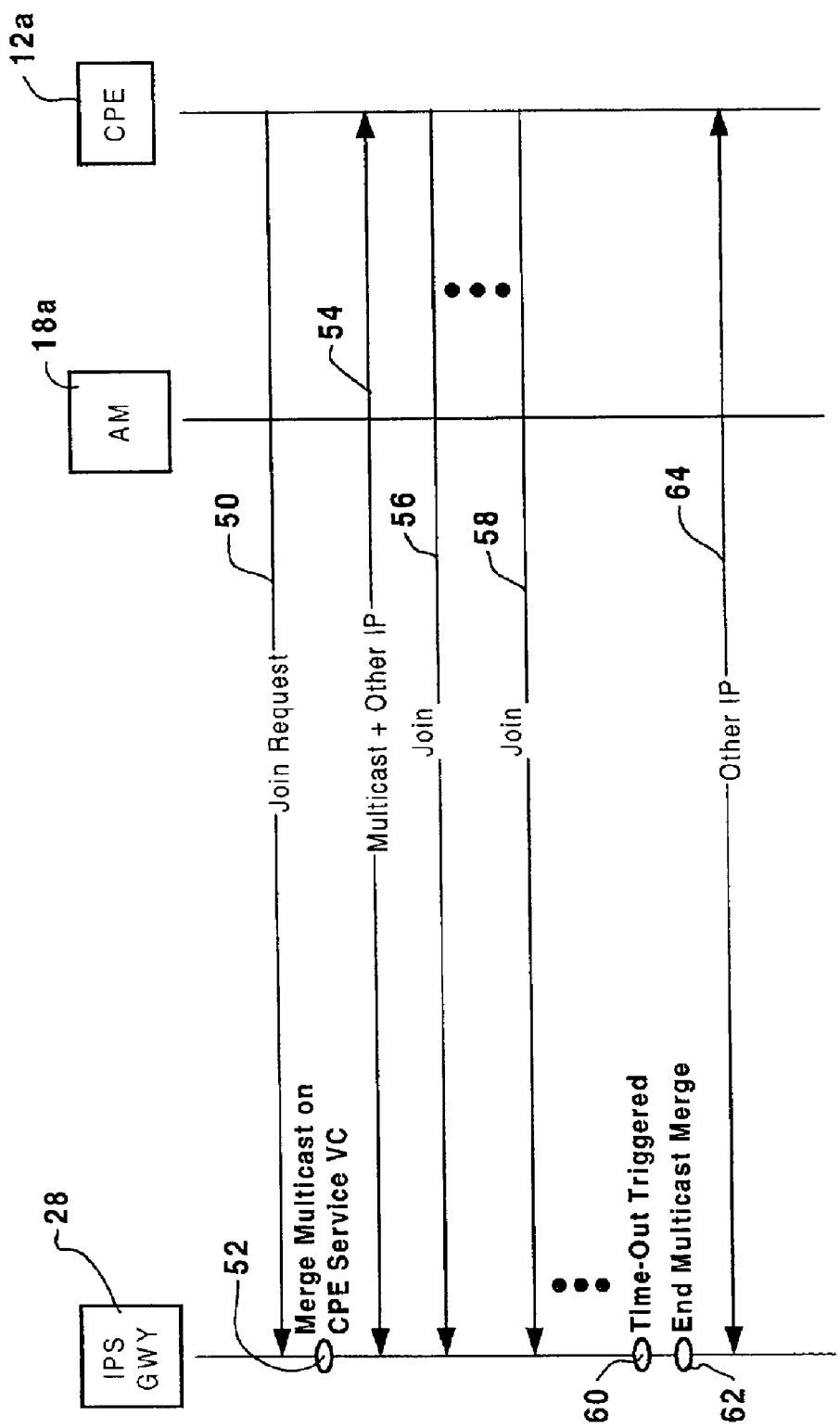
FIG. 2 is a message flow diagram schematically illustrating principal messages exchanged between the IPS GWY and a CPE shown in FIG. 1, to join the CPE to a multicast tree in accordance with prior art procedures currently used.

FIG. 2 is a message flow diagram illustrating the principal messages exchanged during the set up of a connection between an end-user's CPE 12a and the multicast tree in accordance with the prior art. As shown in FIG. 2, an end-user at CPE 12a sends a join request (step 50) to the IPS GWY 28 to be joined to a multicast tree 26 (FIG. 1) that originates from the multicast server 24 in IP network 26. The IPS GWY 28 will accordingly join the multicast tree using a standard IP multicast protocol. On receipt of the join request at step 50, the IPS GWY 28 performs an IP routing function (step 52) which merges the multicast content with other IP traffic on the VC 30a (FIG. 1) assigned to CPE 12a. As a consequence, the VC 30a transports the multicast content through the ATM switching network 14 and the service access trunk (not shown) that connects the AM 18a to the ATM switching network 14 as shown in step 54 of FIG. 2. After the CPE 12a is connected to the multicast tree, regular join messages, in accordance with IP multicast protocol which is well know in the art, are sent on a periodic basis at steps 56, 58 from the CPE 12a to the IPS GWY 28. When the end-user at CPE 12a wishes to disconnect from the multicast server, in accordance with one IP multicast protocol, join messages are no longer sent. A time-out trigger associated with the VC 30a alerts the IPS GWY 28 (step 60) that the CPE 12a is no longer sending join messages. The IPS GWY 28 therefore terminates the IP multicast packet merge in step 62. Other IP packets (step 64) continue to be transferred through the VC 30a, as it was prior to the IP multicast packet merge occurring. As is known in the art, other methods may be used for disconnect, such as an explicit disconnect message sent from the end-user CPE.

Figure 3:
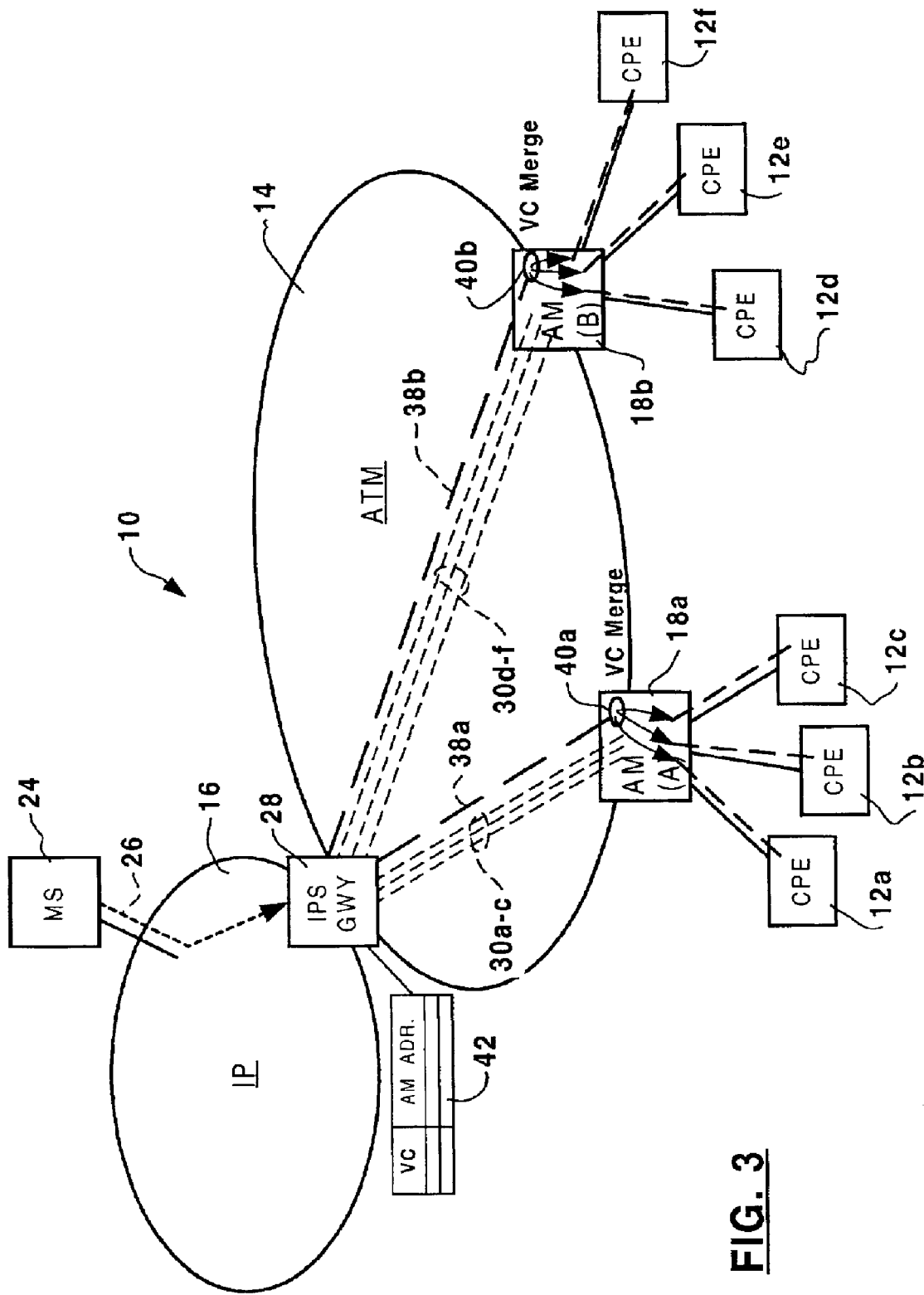
FIG. 3 is a schematic diagram of multicast trees mapped through an ATM switching network in accordance with the invention.

FIG. 3 shows a system in accordance with the invention. Each of the components of the network 10 are identical to those shown in FIG. 1 with the exception that the IPS GWY 28 and the Access Modules 18a, 18b are modified to provide multicast service in accordance with the invention. No modification is required at the multicast server 24 or the CPE 12a–f. Furthermore, no modification is required within the ATM switching network 14 to implement the methods in accordance with the invention. As may be seen in FIG. 3, the end-user VCs 30a–30f which provide a connection between the CPEs 12a–12f and the IPS GWY 28 remain, in order to transfer IP packets between the IPS GWY 28 and the respective CPEs 12a–f. However, the IPS GWY 28 is modified so that it no longer performs an IP packet merge on receipt of a join request from one of the CPEs 12a–f. Instead, the multicast packets are sent to the respective access modules 18a, b using separate virtual connections 38a, b, and an ATM VC merge 40a, 40b is performed by the respective access modules 18a,b. Consequently, only one copy of the multicast packets traverses the ATM switching network 14 for each access module serving CPEs connected to the multicast tree, regardless of the number of CPEs joined to the multicast tree at each AM 18a, b. Congestion in the service access trunks (not shown) connecting each access module 18a,b to the ATM switching network 14 is therefore significantly reduced when two or more CPEs connected to the same AM 18a,b join the same multicast session. Furthermore, a quality of service (QoS) guarantee associated with the VCs 38a, b ensures that the multicast traffic is transferred across the ATM network at a QoS that is generally higher than the QoS associated with the end-user VCs 30a–30f. Consequently, a higher quality service is delivered to the end-user. It should also be noted that the VC merge performed by the access module 18a, b may respect the QoS associated with the respective packet streams so that the quality of service delivery is further improved.

FIG. 4 more clearly illustrates the method in accordance with the invention by schematically showing principal messages exchanged to join a sink node (CPEs 12d, 12f) to the multicast tree 26 (FIG. 3). As shown in FIG. 4, a join request message, well known in the art, is sent from CPE 12d to an ingress node (IPS GWY 28) in step 100. The IPS GWY 28 responds to the join request by referring to an internal table 42 (FIG. 3) that relates the VC on which the join request was received to a network address of the access module 18b.

The IPS GWY 28 therefore formulates a signaling message in accordance with the invention and sends the signaling message to instruct the access module 18b to connect the CPE 12d to the multicast session. As shown in FIG. 4, a multicast service access point (multicast SAP) 29 may be associated with the IPS GWY 28 to handle the actual multicast packet delivery. The multicast SAP 29 may be an integral part of the IPS GWY 28, or a separate network element controlled by one or more IPS GWY 28.

As is well known in the art, each multicast session is assigned a unique session identifier that enables the IPS GWY 28 to identify the multicast session to the access module 18b by including the session identifier in the signaling message. On receipt of the signaling message sent in step 102, the access module 18b determines in step 104 whether it is branched to the multicast session. In this example, the access module 18b is not branched to the multicast session. The access module 18b therefore sends an SVC setup message in step 106 to the IPS GWY to request the setup of an SVC by the IPS GWY 28 in order to supply the multicast packets. Upon connecting to the multicast ATM SAP, multicast packets begin flowing to the access module 18b in step 110. It should be understood that the illustrated method of connecting the access module 18b to the multicast tree is only one of several methods that can be used. It should also be understood that instead of ATM SVCs, permanent virtual circuits (PVCs) may be used for multicast packet delivery to the access module 18b, in which case the access module 18b could attach a leaf to a pre-provisioned PVC when access to the multicast packets is required.

As will be understood by persons skilled in the art, if the multicast SAP 29 is not already connected to a branch of the multicast tree 26 (FIG. 3), the IPS GWY 28 signals the MS 24 (FIG. 3) to request connection of the multicast SAP 29 to the multicast tree in order to receive the multicast packets which are sent in step 110 to the access module 18*b*. On receipt of the multicast packets, the access module 18*b* grafts a leaf to the multicast tree in step 112, to add the CPE 12*d* to the multicast tree. In step 114, the access module 18*b* performs a VC merge to merge the multicast traffic with other traffic sent over the VC that serves the CPE 12*d*. As will be understood by persons skilled in the art, the VC merge is a packet merge, and the merge may respect the respective QoS levels of the multicast packets and other IP traffic streams. Thus, the multicast and other IP traffic are delivered to the CPE 12*d* in step 116. In order to remain a part of the multicast tree, CPE 12*d* may send join messages at regular intervals to the IPS GWY 28, as is well known in the protocol in accordance with the prior art. In accordance with the invention, this protocol remains unchanged. Consequently, CPE 12*d* can send join messages at regular intervals (steps 118, 126, 134) to the IPS GWY 28.

In step 120, the CPE 12*f* sends a join request message to the IPS GWY 28 requesting a join to the same multicast tree. The IPS GWY 28 responds by sending a signaling message in step 122 to the access module 18*b* requesting that the access module 18*b* join the CPE 12*f* to the multicast session. On receipt of the signaling message, the access module 18*b* consults internal tables and determines that it already terminates a branch of the multicast tree. It therefore creates a leaf for the CPE 12*f* in step 124 and performs a VC merge in step 128 to add the multicast packet traffic to other IP traffic travelling over the VC that serves the CPE 12*f* (step 130). Thereafter, CPE 12*f* may send join messages (132, 146) at regular intervals to the IPS GWY 28 to maintain its connection to the multicast tree. In the meantime, CPE 12*d* ceases sending join messages after the join message sent in step 134. After a given time interval, a time-out is triggered (step 136) which prompts the IPS GWY 28 to disconnect CPE 12*d* from the multicast tree. The IPS GWY 28 therefore sends a disconnect message over a signaling channel in step 138 to the access module 18*b*. On receipt of the signaling message, the access module 18*b* removes the leaf that joins CPE 12*d* to the multicast tree (step 140) and ends the VC merge (step 142). Thereafter, other IP traffic is carried over the VC that serves the CPE 12*d* (step 144). In step 146, the CPE 12*f* sends a last join message to the IPS GWY 28. In the manner described, the cessation of transmission of join messages to the IPS GWY 28 causes a time-out to be triggered in step 148. When the time-out is triggered, the IPS GWY 28 sends a disconnect message to the access module 18*b* requesting that the CPE 12*f* be disconnected from the multicast tree (step 150). In step 152, the access module 18*b* removes the leaf from the multicast tree and ends the VC merge in step 154. Since the access module no longer requires the multicast packet traffic, if the multicast packets are carried on an SVC, it sends an SVC release in step 156 to the ATM network requesting that the SVC 38*b* that carries the multicast traffic to the access module 18*b* be released. In response, the IPS GWY 28 instructs the multicast SAP 29 to cease transmitting the multicast packets over the SVC, the SVC is released and a release acknowledgement is transmitted (step 158) back to the access module 18*b*. It will be understood that the method of disconnecting from a multicast tree described above is only exemplary of protocols used for that purpose. Some protocols support explicit disconnect messages, while others support discrete headend queries, etc.

Thus, it will be seen that the present invention provides a method and apparatus for grafting connections to a multicast tree which substantially eliminate redundant duplication of multicast traffic within the ATM switching network 4. Furthermore, since the multicast packet traffic traverses the ATM switching network via a VC that is independent of the end-user VC, quality of service (QoS) provisions in the ATM network govern delivery of the multicast packet traffic to the DSLAM. At the DSLAM, the multicast packet traffic, which has an associated QoS, is merged with other IP traffic for the end-user, which normally has a different QoS. Thus, the end-user is provided with a better service, without being aware of QoS considerations in the transport network.

The embodiment(s) of the invention described above is(are) intended to be exemplary only. The scope of the invention is therefore intended to be limited solely by the scope of the appended claims.

I claim:

1. A method of setting up a connection through an Asynchronous Transfer Mode (ATM) switching network between a sink node and a multicast tree, the multicast tree being coupled to the ATM switching network via an ingress node, and the sink node being coupled to the ATM switching network via an access module, the method comprising the steps of:
  a) identifying the access module through which the sink node is coupled to the ATM switching network;
  b) sending a message to the access module requesting that the sink node be connected to the multicast tree;
  c) grafting a leaf to the multicast tree at the access module to connect the sink node to the multicast tree; and
  d) merging multicast packets into an existing service connection for the sink node.

2. A method as claimed in claim 1, wherein the step of identifying is performed by the ingress node, which is a service gateway to an Internet Protocol (IP) network and am associated multicast service access point.

3. A method as claimed in claim 2, wherein the step of identifying comprises a step of examining a virtual channel (VC) on which a join request message was received from the sink node to identify the access module and the sink node.

4. A method as claimed in claim 3, wherein the access module is one of a digital subscriber line access multiplexer (DSLAM); cable headend; wireless headend; satellite base station; ATM side of customer premise equipment; and optical line termination.

5. A method as claimed in claim 1, wherein the step of merging the multicast packets into the existing service connection further comprises a step of performing a virtual channel (VC) merge, to merge the multicast packets with other IP packet traffic for the sink node.

6. A method as claimed in claim 5, wherein the step of performing the VC merge is performed by the access module.

7. A method as claimed in claim 1, wherein if the identified access module is not branched to the multicast tree, the method further comprises a step of connecting the access module to the multicast tree.

8. A method as claimed in claim 7, wherein the step of connecting the access module to the multicast tree comprises steps of:
  a) establishing a switched virtual circuit (SVC) connection between the access module and the ingress node through the ATM switching network, if required;
  b) grafting a leaf to the multi-cast tree for the sink node; and
  c) performing a VC merge, to merge the multicast packets with other IP packet traffic for the sink node.

9. A system for setting up a connection through an Asynchronous Transfer Mode (ATM) switching network between a sink node and a multicast tree, the multicast tree being coupled to the ATM switching network via an ingress node, and the sink node being coupled to the ATM switching network via a respective one of a plurality of access modules, the system comprising:
   a) means for identifying an access module through which the sink node is coupled to the ATM switching network;
   b) means for determining whether the identified access module is already part of the multicast tree;
   c) means for grafting a leaf to the multicast tree at the identified access module when the identified access module is connected to the multicast tree; and
   d) means for merging multicast packets with other IP traffic on an existing service channel for the sink node.

10. A system as claimed in claim 9, wherein the ingress node is a Internet Protocol Service Gateway (IPS GWY).

11. A system as claimed in claim 10, wherein the means for identifying the access module and the sink node comprises means for relating a virtual channel (VC) on which a join request is received from the sink node with an access module that supports the virtual channel.

12. A system as claimed in claim 9, wherein the means for determining whether the identified access module is part of the multicast tree comprises:
   a) a multicast session identifier sent from the ingress node to the access module, the multicast session identifier uniquely identifying the multicast session; and
   b) means for using the multicast session identifier at the access module to determine whether multicast traffic associated with the multicast session identifier is being received at the access module.

13. A system as claimed in claim 10, further comprising means for performing a VC merge at the access module.

14. A system as clawed in claim 9, further comprising means for grafting a branch to the multicast tree from the ingress node to the access module, if the access module is not branched to the multicast tree.

15. A system as claimed in claim 14, wherein the means for grafting the branch to the multicast tree at the access module comprises:
   a) means for establishing a virtual circuit (VC) connection between the ingress node and the access module through the ATM switching network;
   b) means for grafting the leaf to the branch of the multicast tree; and
   c) means for performing a VC merge to merge multicast packets with other IP packets arriving for the sink node.

16. An Internet Protocol Service Gateway (IPS GWY) adapted to reduce duplication of multicast traffic through an Asynchronous Transfer Mode (ATM) switching network the IPS GWY comprising:
   a) means for identifying an access module through which a sink node that requested a join to a multicast tree is coupled to the ATM switching network;
   b) means for requesting the access module to join the sink node to the multicast tree; and
   c) means for sag up a virtual connection to the access module to connect the access module to the multicast tree.

17. An IPS GWY as claimed in claim 16, wherein the means for identifying the access module and the sink node comprises a table that relates a virtual channel (VC) on which a join request was received with a network address of the access module and the sink node.

18. An IPS GWY as claimed in claim 16, wherein the means for requesting the access module to join the sink node to the multicast tree comprises means for formulating a signaling message to request the join and for sending the signaling message to the access module.

19. An IPS GWY as claimed in claim 16 wherein the IPS GWY controls an associated multicast service access point (multicast SAP) that supplies multicast packets to the access module.

20. An IPS GWY as claimed in claim 19 wherein the multicast SAP is co-located with the IPS GWY.

21. An IPS GWY as claimed in claim 19 wherein the multicast SAP is remote from the IPS GWY and controlled by at least one IPS GWY.

22. An access module for an Asynchronous Transfer Mode (ATM) switching network adapted to enable grafting of a connection between a sink node and a multicast tree, the access module being coupled to the ATM switching network and the sink node, the access module comprising means for grafting a leaf to the multicast tree to connect the sink node to the multicast tree, and the access module comprises any one of a digital subscriber line access multiplexer (DSLAM); cable headend; wireless headend; satellite base station; ATM side of customer premise equipment; and optical line termination.

23. An access module as claimed in claim 22, wherein the means for grafting comprises:
   a) means for receiving a signaling message from an ingress node through which the sink node internet protocol (EP) virtual circuit (VC) enters the ATM switching network, the signaling message requesting that the access module connect the sink node to the multicast tree; and
   b) means for performing a virtual channel (VC) merge to merge the multicast packets with other IP traffic for the sink node.

24. An access module as claimed in claim 23 further comprising:
   means for receiving a further signaling message from the ingress node, the further sing message instructing that the sink node be disconnected from the multicast tree.

25. An access module as claimed in claim 24, further comprising means for disconnecting the sink node from the multicast tree and ending the VC merge.

26. An access module as claimed in claim 25 further comprising means for disconnecting from the multicast tree after all sink nodes are disconnected from the multicast tree.

27. A method of providing multicast service delivery to an end-user of ATM access services served by an access module connected to an asynchronous transfer mode (ATM) switching network, comprising steps of:
   a) setting up a separate connection between an access module serving a plurality of the end-users and a gateway for delivering multicast packets from a source network, to permit the multicast packets to be transferred across the ATM switching network independently of any end-user virtual channel (VC) supported by the access module; and
   b) merging the multicast packets with other Internet Protocol (IP) traffic on the end-user VC at the access module, to deliver the multicast packets to the end-user.

28. The method as claimed in claim 27 wherein the separate connection is used to provide the multicast service to each of the plurality of end-users who request to join the multicast session.

29. The method as claimed in claim 28 wherein the gateway instructs the access module to merge the multicast packets with the other IP traffic on the end-user VC.

30. The method as claimed in claim 29 wherein the gateway instructs the access module to end merging the multicast packets with the other IP traffic on the end-user VC when the gateway receives an indication on the end-user VC that the end-user wishes to disconnect from the multicast tree.

31. The method as claimed in claim 28 wherein the separate connection has an associated quality of service guarantee across the ATM switching network.

32. A method of setting up a connection through a connection-oriented network between a sink node and a multicast tree, the multicast tree being coupled to the connection-oriented network via an ingree node, and the sink node being coupled to the connection-oriented network via an access module, the method comprising the steps of:
   a) identifying the access module through which the sink node is coupled to the connection-oriented network;
   b) sending a message to the access module requesting that the sink node be connected to the multicast tree;
   c) grafting a leaf to the multicast tree at the access module to connect the sink node to the multicast tree; and
   d) merging multicast packets into an existing service connection for the sink node.

33. The method as claimed in claim 32, wherein the step of identifying comprises a step of examining a virtual channel (VC) on which a join request message was received from the sink node to identify the access module and the sink node.

34. The method as claimed in claim 32, wherein the step of merging the multicast packets into the existing service connection further comprises a step of performing a virtual channel (VC) merge, to merge the multicast packets with other IP packet traffic for the sink node.

35. The system for setting up a connection through connection oriented network between a sink node and a multicast tree, the multicast tree being coupled to the connection oriented network via an ingress node, and the sink node being coupled to the connection oriented network via a respective one of a plurality of access modules, the system comprising:
   a) means for identifying an access module through which the sink node is coupled to the connection oriented network;
   b) means for determining whether the identified access module is already part of the multicast tree;
   c) means for grafting a leaf to the multicast tree at the indentified access module when the identified access module is connected to the multicast tree; and
   d) means for merging multicast packets with other IP traffic on an existing service channel for the sink node.

36. The system as claimed in claim 35, wherein the means for identifying the access module and the sink node comprises means for relating a virtual channel (VC) on which a join request is received from the sink node with an access module that supports the virtual channel.

37. The system as claimed in claim 35, wherein the means for determining whether the identified access module is part of the multicast tree comprises:
   a) a multicast session identifier sent from the ingress node to the access module, the multicast session identifier uniquely identifying the multicast session; and
   b) means for using the multicast session identifier at the access module to determine whether multicast traffic associated with the multicast session identifier is being received at the access module.

38. The system as claimed in claim 35, further comprising means for performing a VC merge at the access module.

39. The system as claimed in claim 35, further comprising means for grafting a branch to the multicast tree from the ingree node to the access module, if the access module is not branched to the multicast tree.

40. An Internet Protocol Service Gateway (IPS GWY) adapted to reduce duplication of multicast traffic through a connection oriented network, the IPS GWY comprising:
   a) means for identifying an access module through which a sink node that requested a join to a multicast tree is coupled to the connection oriented network;
   b) means for requesting the access module to join the sink node to the multicast tree; and
   c) means for setting up a virtual connection to the access module to connect the access module to the multicast tree.

41. The IPS GWY as claimed in claim 40, wherein the means for identifying the access module and the sink node comprises a table that relates a virtual channel (VC) on which a join request was received with a network address of the access module and the sink node.

42. The IPS GWY as claimed in claim 40, wherein the means for requesting the access module to join the sink node to the multicast tree comprises means for formulating a signaling message to request the join and for sending the signaling message to the access module.

43. The IPS GWY as claimed in claim 40, wherein the IPS GWY controls an associated multicast service access point (multicast SAP) that supplies multicast packets to the access module.

44. An access module for a connection oriented network adapted to enable grafting of a connection between a sink node and a multicast tree, the access module being coupled to the connection oriented network and the sink node, the access module comprising means for grafting a leaf to the multicast tree to connect the sink node to the multicast tree, and the access module comprises any one of a digital subscriber line access multiplexer (DSLAM); cable head-end; wireless headend; satellite base station; network side of customer premise equipment; and optical line termination.

45. The access module as claimed in claim 44, wherein the means for grafting comprises:
   a) means for receiving a signaling message from an ingress node through which the sink node internet protocol (IP) virtual circuit (VC) enters the connection oriented network, the signaling message requesting that the access module connect the sink node to the multicast tree; and
   b) means for performing a virtual channel (VC) merge to merge the multicast packets with other IP traffic for the sink node.

46. A method of providing multicast service delivery to an end-user of connection oriented access services served by an access module connected to a connection oriented network, comprising steps of:
   a) setting up a separate connection between an access module serving a plurality of the end-users and a gateway for delivering multicast packets from a source network, to permit the multicast packets to be transferred across the connection oriented network independently of any end-user virtual channel (VC) supported by the access module; and
   b) merging the multicast packets with other Internet Protocol (IP) traffic on the end-user VC at the access module, to deliver the multicast packets to the end-user.

47. The method as claimed in claim 46 wherein the separate connection is used to provide the multicast service to each of the plurality of end-users who request to join the multicast session.

48. The method as claimed in claim 47 wherein the gateway instructs the access module to merge the multicast packets with the other IP traffic on the end-user VC.

49. The method as claimed in claim 48 wherein the gateway instructs the access module to end merging the multicast packets with the other IP traffic on the end-user VC when the gateway receives an indication on the end-user VC that the end-user wishes to disconnect from the multicast tree.

50. The method as claimed in claim 47 wherein the separate connection has an associated quality of service guarantee across the connection oriented network.

* * * * *

UNITED STATES PATENT AND TRADEMARK OFFICE
CERTIFICATE OF CORRECTION

PATENT NO. : 6,931,005 B1  
DATED : August 16, 2005  
INVENTOR(S) : Diana Joan Wilhelm Page 1 of 1

It is certified that error appears in the above-identified patent and that said Letters Patent is hereby corrected as shown below:

Column 8,
Line 35, "network and am" is corrected to read -- network, and an --.

Column 9,
Line 36, "as clawed" is corrected to read -- as claimed --.
Line 53, "network the" is corrected to read -- network, the --.
Line 60, "for sag" is corrected to read -- for setting --.

Column 10,
Line 29, "protocol (EP)" is corrected to read -- protocol (IP) --.
Line 39, "sing message" is corrected to read -- signaling message --.

Column 11,
Line 13, "ingree node" is corrected to read -- ingress node --.

Column 12,
Line 5, "ingree node" is corrected to read -- ingress node --.

Signed and Sealed this

Twenty-first Day of March, 2006

JON W. DUDAS
*Director of the United States Patent and Trademark Office*